United States Patent Office 3,152,426
Patented Oct. 13, 1964

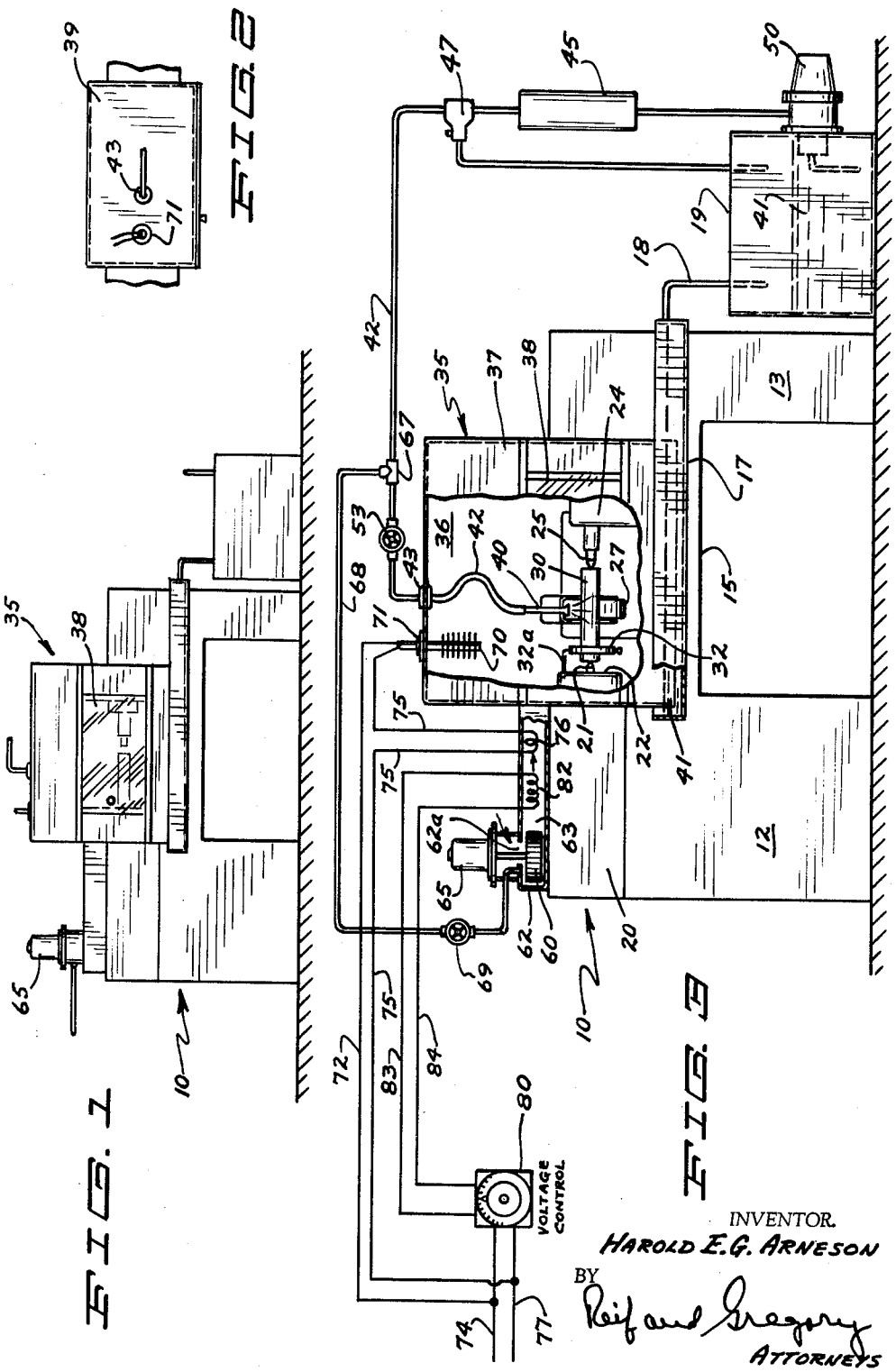

3,152,426
HUMIDITY CHAMBER FOR MACHINE TOOL
Harold E. G. Arneson, % Professional Instruments Co., 6824 W. Lake St., Minneapolis, Minn.
Filed May 23, 1962, Ser. No. 197,119
5 Claims. (Cl. 51—267)

This invention relates to an improvement in a temperature control chamber in connection with a machine tool, such as a grinding machine or a machine on the order of a boring machine, a milling machine or the like. More particularly in connection with a machine tool this invention relates to improvement in providing a humidity chamber to maintain the temperature therein at a steady state.

Effort has been made to control the ambient temperature in connection with a machine tool by a control within certain limits of the dry temperature of the ambient air. This effort is generally made with heating and cooling means, such as with a fan, and a heating coil responsive to thermostatic controls within the work area.

This type of control has many shortcomings. A coolant of a volatile nature is commonly used to spray or flush the work piece and the grinding member of the machine tool. The coolant generally splatters on adjacent portions of the machine. As the coolant evaporates it produces a refrigerating effect causing temperature variations in different degrees in various adjacent portions of the machine. Also as work pieces are changed, the coolant is shut off which effects another change in temperature. At this time evaporation takes place on a substantial scale which has its effect in causing temperature changes in the affected machine parts. Control of dry air temperature has no satisfactory effect in attempting to maintain a steady state of temperature in the machine tool under these conditions.

In unsaturated air it would not be unusual to have a 5° F. to a 10° F. difference between various areas within a chamber and between parts of the machine tool in view of the conditions stated in the above paragraph. Changes in temperature may occur even between splashes of the coolant as a result of evaporation. Attempts to stabilize the temperature of machine parts by regulation of dry air temperature are rendered ineffectual by the presence of a volatile coolant.

In accurately fiinishing a work piece, a change in temperature of a fraction of a degree is often critical in causing a contraction or expansion of a machine part. This directly affects the finished dimension of the work piece. It is necessary to have some means for maintaining the temperature of critical machine members in a steady state, such as within a small fraction of a degree to hold the accuracy of a work piece, such as within .0000010 inch.

It is an object of this invention therefore to provide means for controlling the temperature of machine parts within narrow limits.

It is another object of this invention to provide an atmosphere about the work area of a machine tool which will directly affect and tend to control the temperature of the machine parts within the work area and adjacent the work piece.

It is a further object of this invention to provide an enclosure for the working area of a machine tool and to maintain a saturated atmosphere therein to avoid temperature changes resulting from the evaporation of the coolant used which may splatter different areas of the machine at different times.

More specifically it is an object of this invention to provide a humidity chamber for a machine tool and means in connection therewith to maintain a steady state of temperature of the saturated atmosphere therein.

These and other objects and advantages of the invention will be fully set forth in the following description made in connection with the accompanying drawings in which like reference characters refer to similar parts throughout the several views and in which:

FIG. 1 is a line diagram showing a general view of applicant's device in front elevation, with portions broken away;

FIG. 2 is a top plan view of applicant's enclosure; and

FIG. 3 is a view in front elevation on an enlarged scale showing applicant's enclosure with a portion broken away and related apparatus all in operating position.

With reference to the drawings, a machine tool 10 is indicated. This machine tool may take various forms but is here indicated as of a common design of a grinding or polishing machine.

Said machine tool comprises generally legs 12 and 13 supporting a bed portion 15 which carries a trough 17 having a drain pipe 18 running to a sump 19. Said machine tool further comprises a head stock 20 having a center 21 and a face plate 22, a tail stock 24 having a center 25, and a grinding wheel 27 indicated rearwardly of said centers.

Supported between said centers 21 and 25 is a work piece 30. A bracket or drive dog 32 is shown engaging one end portion of said work piece and having an arm portion 32a angled to be operatively connected with the face plate 22 whereby said face plate will rotate said work piece.

Resting in said trough 17 and upstanding therefrom is a hood or enclosure 35 substantially parallelepiped in form and having a chamber 36 therein. Said enclosure may be variously formed and preferably will be of a transparent material for observation of the work piece and the operation of the machine tool in connection therewith. Carried on the face 37 of said enclosure is shown a sliding panel 38 for access to the machine for the insertion and removal of work pieces. The lower portion of said enclosure 35 is disposed in a reservoir of a liquid 41 which seals off the base portion of said enclosure from the atmosphere. Said liquid comprises the coolant used in the operation of said machine and generally is a water soluble volatile liquid.

Disposed in operating position above the work piece 30 and adjacent the grinder 27 is a spray head or flush nozzle 40 supported from a conduit or line 42 which extends upwardly through an air seal grommet 43 carried in the top 39 of said enclosure, and said line extends in a suitable manner running to a pump 50. Said pump will be suitably hooked up to the sump 19 to pump the coolant therefrom. Mounted in said line 42 above said pump 50 is an overload valve 47 which drains into the sump 19. This permits a continued operation of the pump 50 when the spray head 27 is shut off.

Mounted on the line 42 below said overload valve 47 is a heat exchanger 45 which will be of a common design and which is merely indicated here by diagram. Mounted in the line 42 adjacent the grommet 43 is a shutoff valve 53 controlling the flow of coolant through the spray head.

Conveniently mounted adjacent the hood 35 and as here indicated supported on the head stock 20 is a blower 60 of a suitable design in a cage or housing 62 communicating by means of the conduit 63 with the chamber 36 within said enclosure 35. Hooked up to said blower and mounted on a suitable bracket thereabove is shown a motor 65. Said motor will be connected to a source of power in any suitable manner.

Extending from the line 42 by means of a T 67 is a line 68 running to the inlet 62a of said blower housing 62. Mounted in said line 68 is a flow control valve 69. Thus the air delivered to the chamber 36 by the blower 60 is substantially saturated with water or moisture from the pipe or line 68.

Temperature control of the air moving through the conduit 63 is had by means of a thermostat 70 of a common design shown suspended within said chamber 35 from a fitting 71 mounted in the top 39 of said enclosure. An electrical line 72 runs from said thermostat to an electrical line 74 which extends to a source of current. An electrical line 75 runs from said thermostat to a heating coil 76 mounted in said conduit 63 and from said heating coil to a supply line 77. Said coil 76 will be of relatively small capacity to take care of intermittent demands for heat. Hence said thermostat 70 is in circuit with said small coil 76.

A substantial heating element 82 is mounted in said conduit 63 having the capacity to satisfy the nominal or general demand of heat in connection with the air passing through said conduit. Said heating element 82 is in circuit with a variable voltage control 80 by means of lines 83 and 84.

*Operation*

The coolant 41 used will be of a common type of volatile coolant and will be the medium used to saturate the atmosphere of the enclosure 35. Said coolant in sufficient quantity will be introduced into the blower housing 62 and mixed with the air delivered into the chamber 36 to provide saturated air for said chamber. The blower 60 will provide air under sufficient pressure to prevent the entrance of any outside air when the panel 38 is opened for exchange of work pieces and the air will be provided in sufficient quantity to make up for any loss of saturated air leaking out when said panel is opened or as a result of any other leaks which may be present or which may develop.

Coil 82 in circuit with the regulator or control 80 will maintain a basic or generally required temperature, particularly to affect the temperature drop resulting from the introduction of the coolant 41 into the air. Said coil 76 is in circuit with said thermostat 70 to supply intermittent demands for heat. Thus a saturated atmosphere of a desired temperature will be maintained within said enclosure 35.

With a work piece 30 in position, the spray head 40 will provide the coolant in sufficient quantity to the work piece.

With the atmosphere within the enclosure 35 maintained in a saturated condition, there will be no evaporation of the coolant from the work piece or from the parts of the machine sprayed or splattered by it. The coolant discharged from the spray head is used primarily to absorb the heat developed in the process of grinding or polishing the work piece. Liquid will collect in the trough at the bottom of the enclosure and be drawn off into the sump from which point it is recirculated.

The heat exchanger 45 tends to maintain the coolant passing into the chamber 36 at the desired temperature to maintain a steady state of temperature within said chamber.

When the panel 38 is opened for the withdrawal or insertion of a work piece or both, there is a sufficient established pressure of air to prevent the admission of outside air and there is a sufficient volume of air to make up any air loss with reference to the air passing outwardly of the panel 38 to the outside atmosphere. Any tendency in the direction of a temperature change will be detected by the thermostat 70 which has in circuit therewith the fast acting heating coil 76 to prevent intermittent changes in temperature.

The control member 80 will be set to nearly maintain the temperature desired within said chamber 36 with final temperature control being accomplished by the coil 76.

The prevention of evaporation by the maintenance of a saturated atmosphere is a key element in keeping the temperatures of the machine tool, work piece and atmosphere within said chamber 36 in a steady state. This becomes critical in handling work pieces, for example, where a small change of temperature will result in a dimensional change in the work piece and will cause expansion or contraction of the portion of the machine tool within said chamber 36.

Applicant has achieved remarkable improvement in the degree of dimensional accuracy attainable in finishing work pieces in connection with a grinding machine with the use of his enclosure and the humidity chamber therein.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. A humidity chamber in connection with a machine tool of the character described having in combination,
    an enclosure containing said machine tool,
    means passing air into said enclosure under pressure greater than atmospheric pressure, and
    means saturating said air passing into said enclosure, said saturated air filling said enclosure and enveloping said machine tool.

2. A humidity chamber in connection with a machine tool of the character described having in combination,
    an enclosure having said machine tool therein,
    a blower passing air into said enclosure,
    means for the passage of said air from said blower to said enclosure,
    means in connection with said blower saturating the air passing into said enclosure, and
    means in connection with said first mentioned means controlling the temperature of said saturated air.

3. A humidity chamber in connection with a machine tool of the character described having in combination,
    an enclosure comprising a chamber having said machine tool therein,
    means for the passage of air to said chamber,
    means passing air through said first mentioned means,
    a liquid supply,
    means conducting said liquid to said first mentioned means saturating the air therein passing to said chamber,
    means determining the temperature of said saturated air passing into said chamber, and
    means within said chamber detecting changes in temperature of said saturated air within said chamber and actuating said temperature determining means.

4. A humidity chamber in connection with a machine tool of the character described having in combination,
    an enclosure comprising a chamber having said machine tool therein,
    a blower passing air to said chamber,
    a conduit for the passage of said air from said blower to said chamber,
    a liquid supply,
    means conducting said liquid to saturate said air passing into said chamber,
    heating elements within said conduit determining the temperature of said saturated air passing into said chamber, and
    a temperature detecting means in said chamber responsive to changes in the temperature of the saturated air within said chamber to actuate at least one of said heating elements.

5. A humidity chamber in connection with a machine tool of the character described having in combination,
    a chamber enclosing said machine tool, a container having liquid therein forming a base for said chamber,
a conduit for the passage of air to said chamber,
means passing air through said conduit,
means comprising a liquid spray saturating said air passing through said conduit,
heating means in connection with said conduit determining the temperature of the saturated air passing therethrough to said chamber,
a temperature detecting means within said chamber, and
heating means in connection with said conduit being quickly responsive to said temperature detecting means providing an intermittent supply of heat to maintain a desired temperature of the saturated air of said chamber.

References Cited in the file of this patent

UNITED STATES PATENTS

| | | | |
|---|---|---|---|
| 2,221,127 | Bates | Nov. 12, | 1940 |
| 2,279,569 | Jelinek et al. | Apr. 14, | 1942 |
| 2,330,167 | Zimmerman | Sept. 21, | 1943 |
| 2,384,225 | Wilson | Sept. 4, | 1945 |
| 2,579,193 | Kosbab | Dec. 18, | 1951 |
| 2,595,559 | Alvord | Mar. 6, | 1952 |
| 2,929,566 | Paasche | Mar. 22, | 1960 |
| 2,996,846 | Leliaert | Aug. 22, | 1961 |

FOREIGN PATENTS

| | | | |
|---|---|---|---|
| 306,432 | Switzerland | June 16, | 1955 |